Aug. 14, 1956

R. H. SMITH 2,758,515

TEMPLATE SYSTEM FOR CONTOUR MILLING MACHINES

Filed July 21, 1954

INVENTOR.
ROGER H. SMITH
BY *Ely, Fryer & Hamilton*
ATTORNEYS

Aug. 14, 1956  R. H. SMITH  2,758,515
TEMPLATE SYSTEM FOR CONTOUR MILLING MACHINES
Filed July 21, 1954  14 Sheets-Sheet 5

INVENTOR
ROGER H. SMITH
BY Ely, Frye & Hamilton
ATTORNEYS

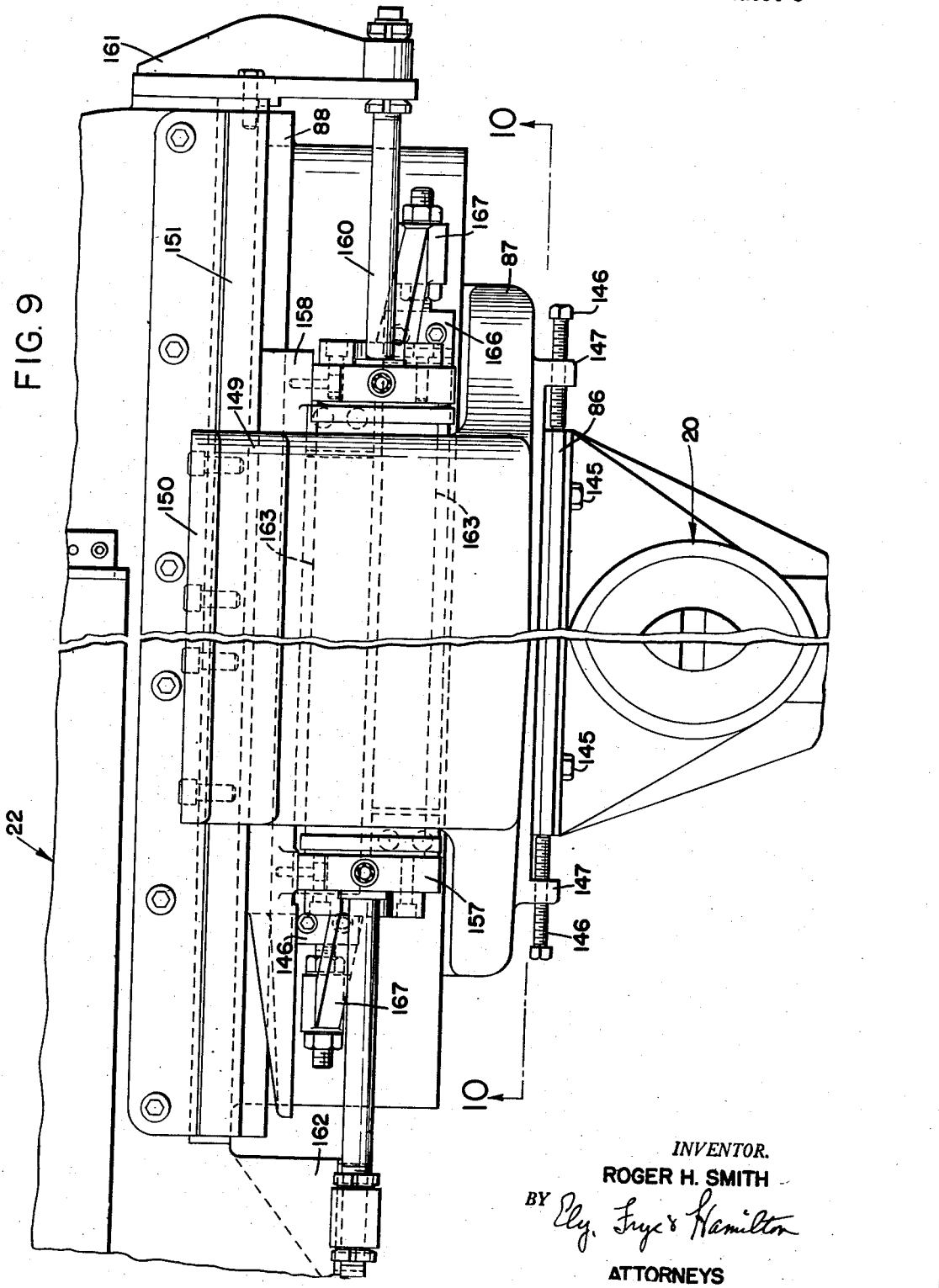

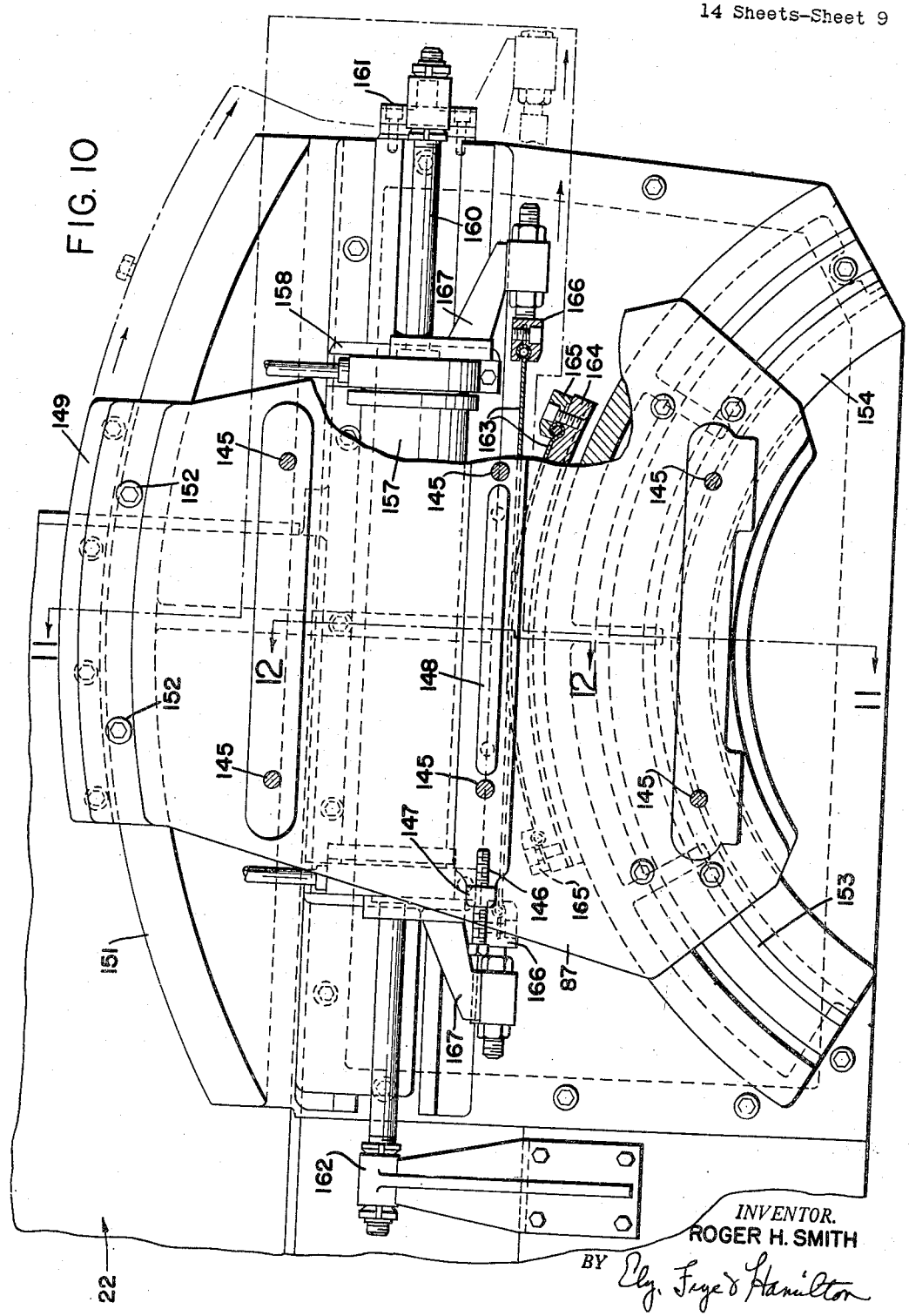

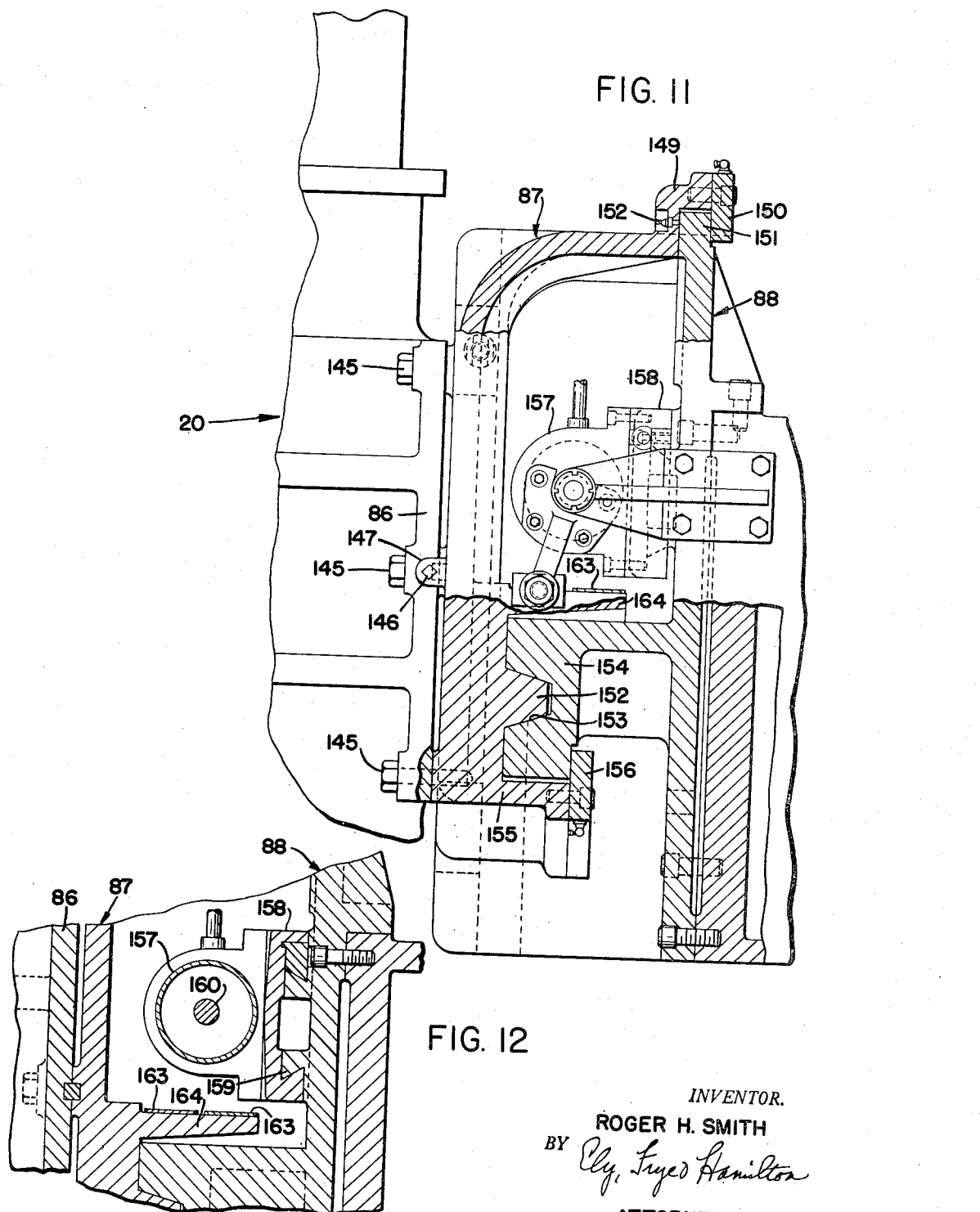

INVENTOR.
ROGER H. SMITH

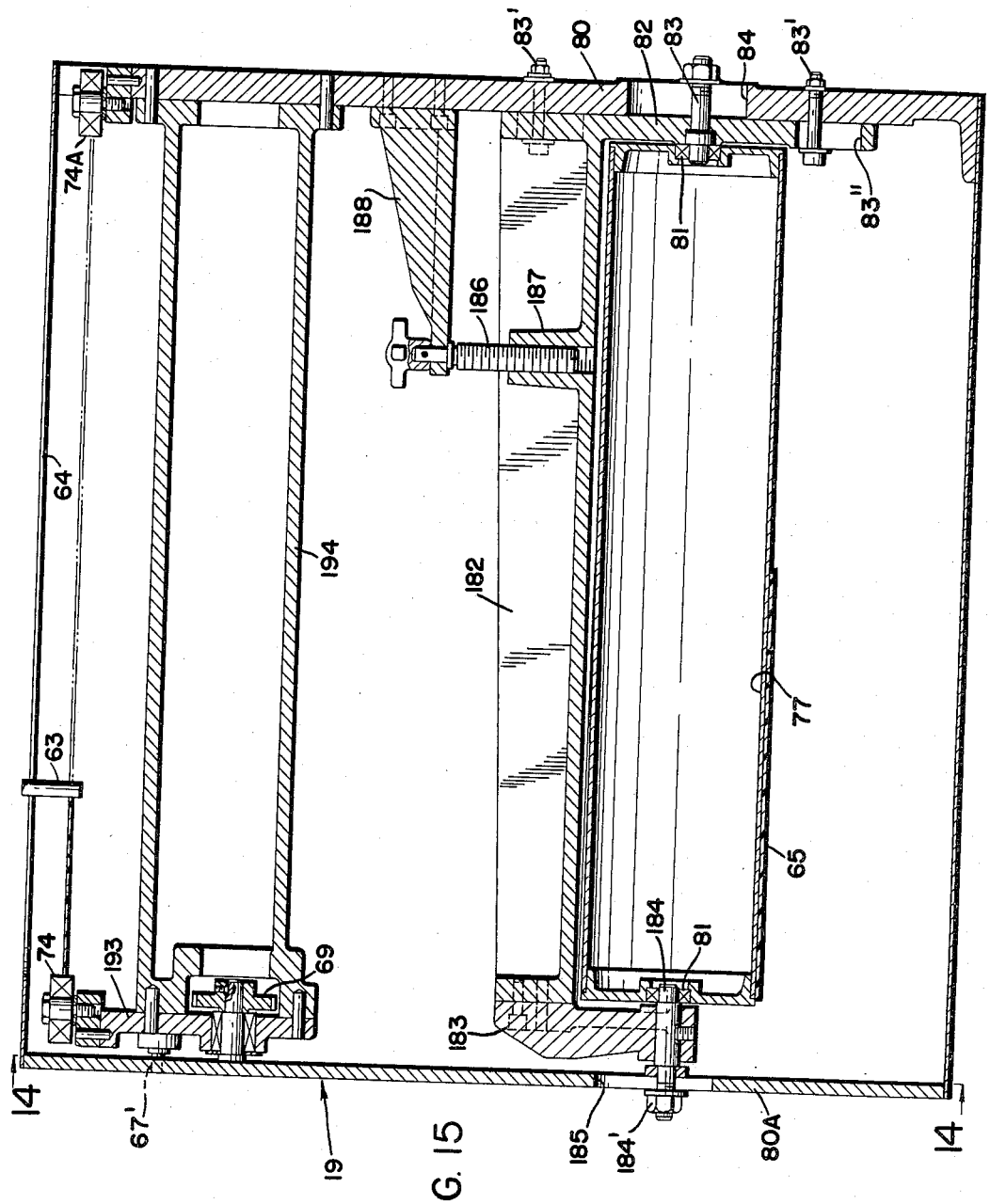

Aug. 14, 1956 R. H. SMITH 2,758,515
TEMPLATE SYSTEM FOR CONTOUR MILLING MACHINES
Filed July 21, 1954 14 Sheets-Sheet 14
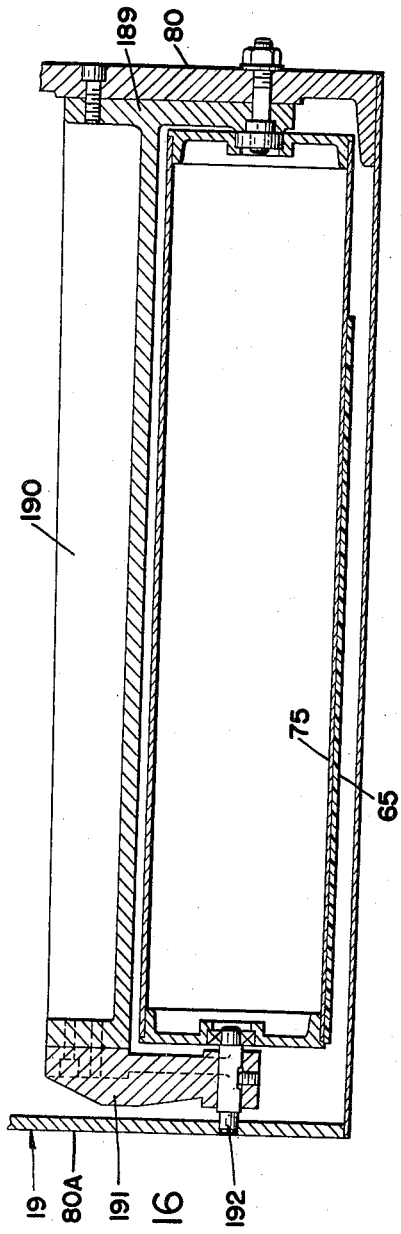
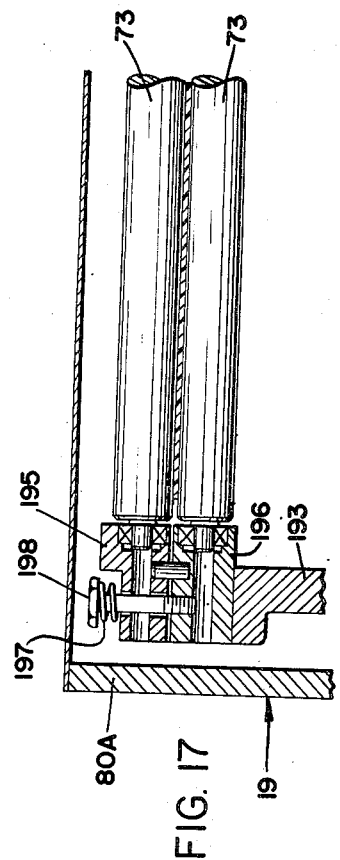
INVENTOR.
ROGER H. SMITH
BY *Ely, Frye & Hamilton*
ATTORNEYS

United States Patent Office 2,758,515
Patented Aug. 14, 1956

2,758,515

TEMPLATE SYSTEM FOR CONTOUR MILLING MACHINES

Roger H. Smith, Akron, Ohio, assignor to Bridgwater Machine Tool Co., Akron, Ohio, a corporation of Ohio Application July 21, 1954, Serial No. 444,810

2 Claims. (Cl. 90—62)

The invention relates generally to milling machines for milling surfaces of gradually changing angles on contoured surfaces on circular, elliptical, irregular and elongated workpieces. More particularly, the present invention relates to a novel template system which controls the movement of the workhead to and from the work to follow the profile of the work, and at the same time controls the angle of the cutting tool to follow changing angles on the work surfaces.

Milling machines of this type generally include a rotatable or reciprocable table on which the workpiece is mounted, a spindle carrying the cutting tool and pivotally mounted over the table for tilting the axis of the tool, and a template or pattern moving concurrently with the table and cooperating with a follower actuating a tracer valve for guiding the tool to reproduce the pattern on the workpiece. Machines of this general type have been used for engraving tread patterns in tire molds, in which case the template has been a cylinder bearing a section of the tread design preferably enlarged to some convenient ratio to the actual tread size, such as 4 to 1.

However, such templates have a number of disadvantages; if the pattern is enlarged its length is greatly limited, and if it is reduced in size to accommodate longer lengths, its accuracy is impaired. Moreover, laying out a pattern around a cylinder for reproducing the pattern on a different scale on a workpiece of changing contour is a difficult and expensive operation.

An improved machine of this general type is shown in United States Letters Patent No. 2,669,908, granted to F. A. Buechler on February 23, 1954. The machine of said patent is adapted for machining gradually changing angles or contours on the peripheries of elliptical aircraft frame members, and two templates are provided, one on the table under the workpiece for controlling the movement of the table to and from the tool as the diameter of the work changes, and a cylindrical template for controlling the tilting movement of the cutting tool as the angles on the work surfaces change. The template on the work table, under the workpiece, is located in a disadvantageous position because it is under the work where it is difficult of access, and where chips and foreign matter tend to collect on the template and interfere with accurate cooperation therewith by the follower. Moreover, with such a template, it is impossible to cut inside surfaces or inside pockets on the workpiece because the cutting tool and the follower are always on the outside of the work.

The novel and improved template system of the present invention embodies two endless belt templates, each having one edge contoured and cooperating with a stylus and tracer valve to reproduce a desired pattern in the work, one template controlling the movement of the cutting head to and from the work, and the other controlling the tilt or angle of the tool. The developed length of each belt template is proportioned to the circumferential length of the work table, and each template is driven at such speed that one complete pass of the template equals one revolution of a rotary table or one stroke of a reciprocating table. The belts are wrapped back and forth around a series of rollers so that they can be enclosed in small, compact housings located at convenient positions on or around the machine.

The principal object of the present invention is to provide a novel and improved template system for contour milling machines which overcomes the foregoing disadvantages, which simplifies the laying out of the pattern and improves its accuracy, and which provides great flexibility in respect to use with various machines.

A specific object is to provide a novel template which is adapted for making cuts on both outside and inside surfaces.

Another object is to provide a novel template in a form which is economical and easy to manufacture, and on which the required pattern or contour is easily and accurately formed without compensating for a difference in diameter of the follower and the cutting tool.

A further object is to provide a novel template which is adapted to be located in a small compact housing detachably mounted on the machine in a convenient and accessible location.

These and other objects are accomplished by the parts, combinations and arrangements comprising the present invention, preferred embodiments of which are illustrated by way of example in the accompanying drawings and described in detail herein, the scope of the invention being defined in the appended claims. Various modifications and changes in construction are comprehended within the scope of the appended claims.

Referring to the drawings.

Figure 1:
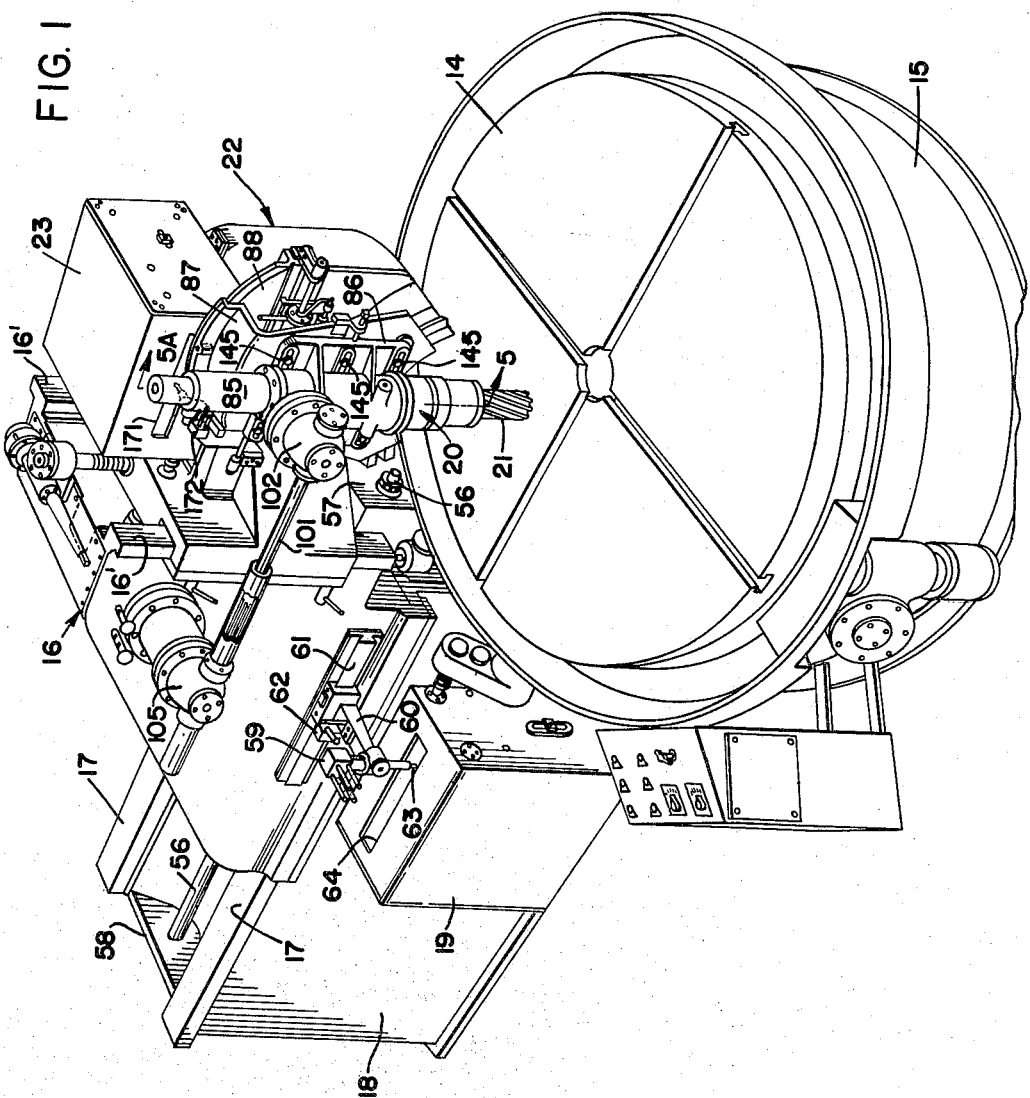
Fig. 1 is a perspective view of a contour milling machine embodying the invention and having a rotating table adapted principally for milling surfaces of changing angle on work of a generally circular or elliptical form.
Figure 5:
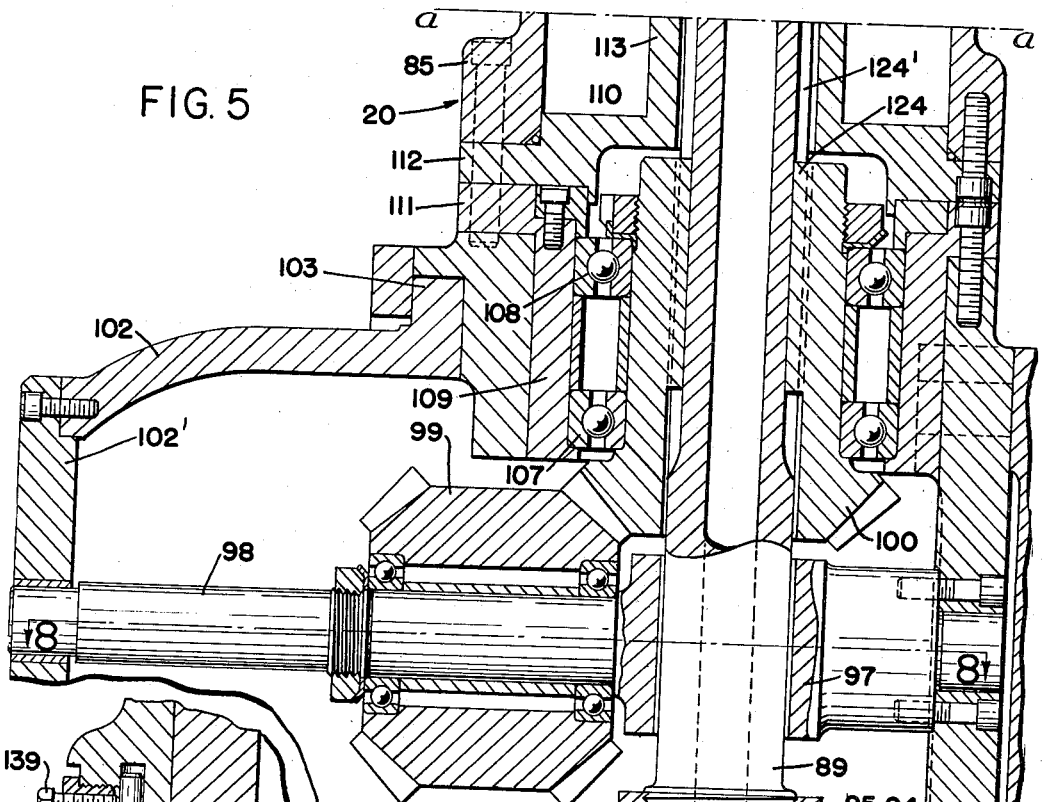
Figure 6:
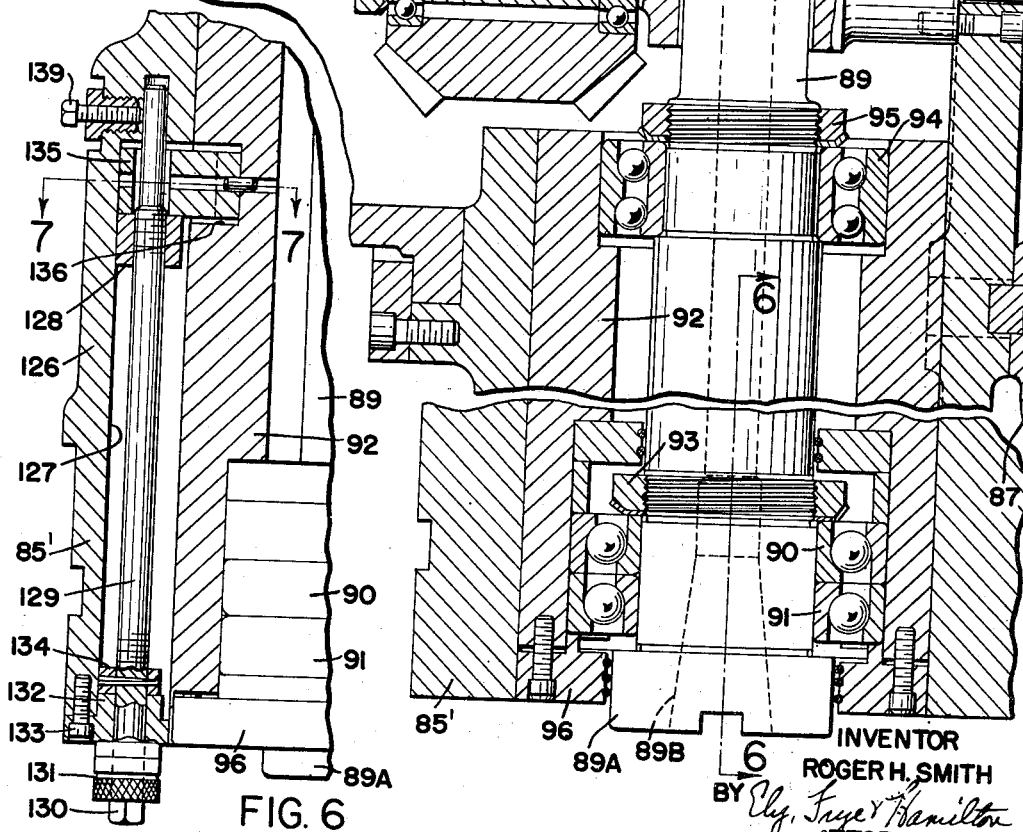
Figure 7:
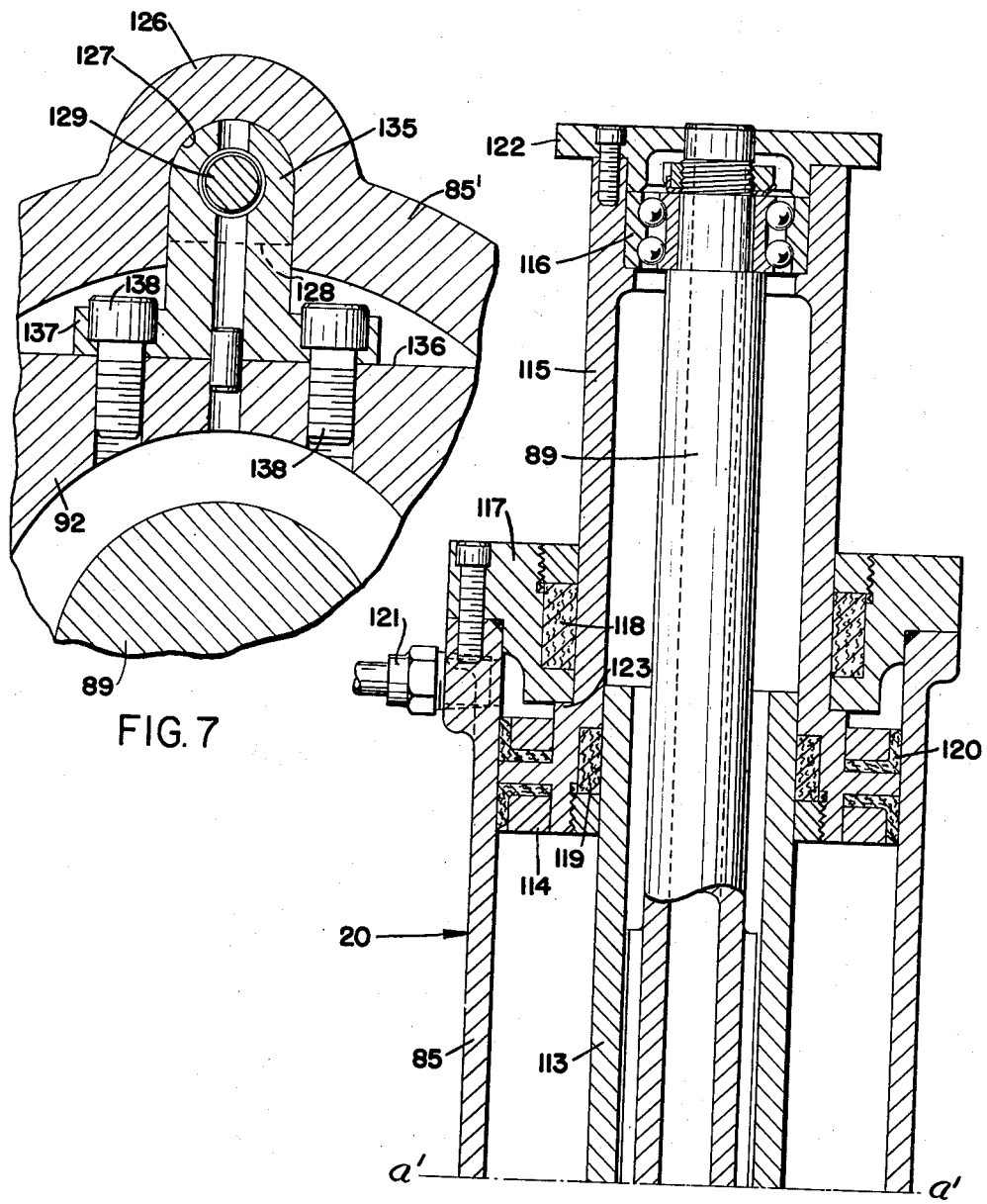
Figure 8:
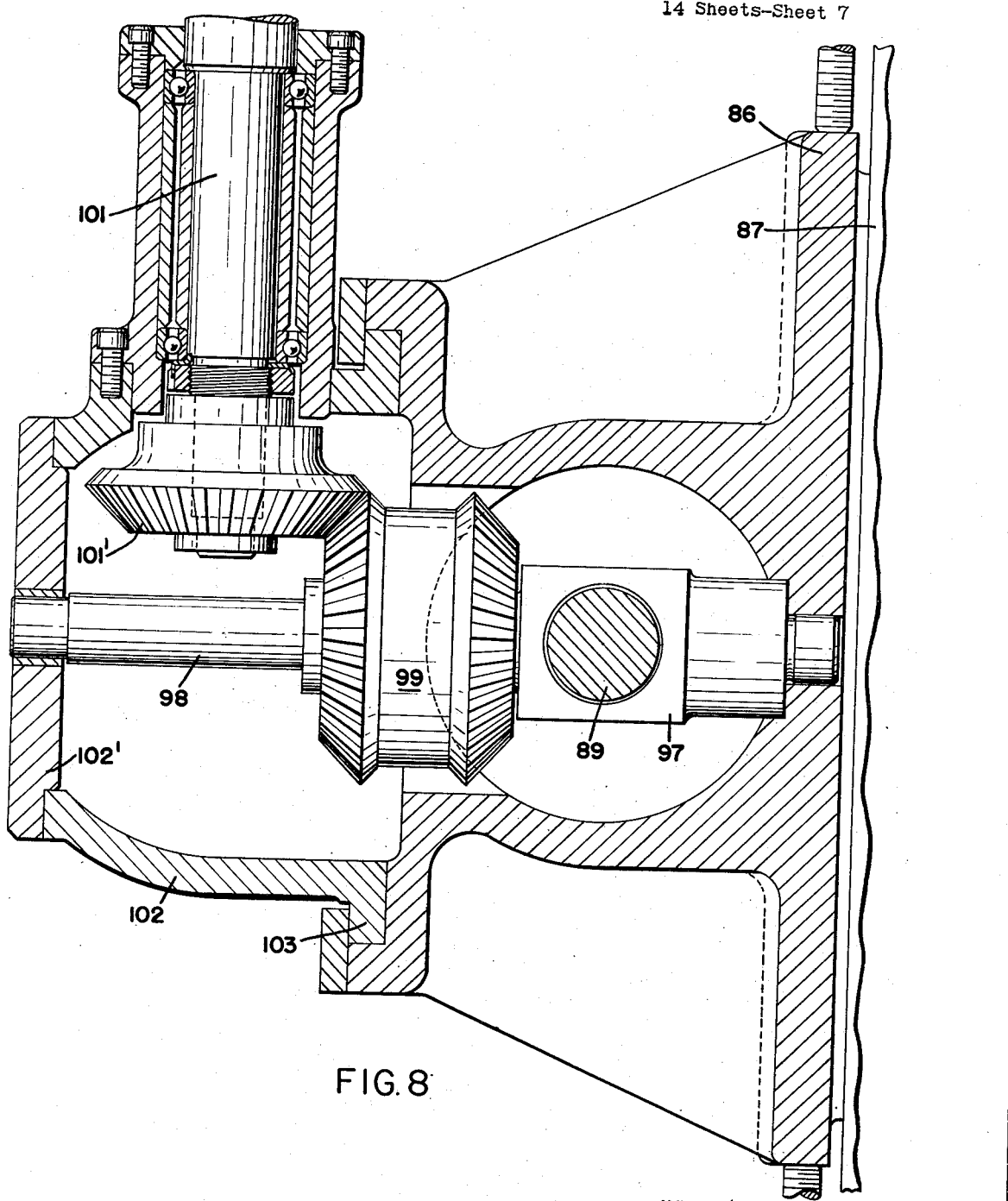

Figs. 5 and 5A, taken together, constitute an enlarged vertical section taken substantially on line 5—5A of Fig. 1;

Fig. 6 is a fragmentary sectional view of the lower end of the spindle housing as on line 6—6, Fig. 5;

Fig. 7 is a cross section on line 7—7 of Fig. 6;

Fig. 8 is a fragmentary cross sectional view on line 8—8, Fig. 5;

Fig. 9 is a fragmentary plan elevation looking down on the top of the vertical tool spindle of Fig. 1, and its associated parts;

Fig. 10 is a vertical section on line 10—10, Fig. 9, showing in elevation the construction for pivotally mounting the tool spindle, parts being broken away and in section;

Fig. 11 is a fragmentary sectional view substantially on line 11—11, Fig. 10.

Figure 13:
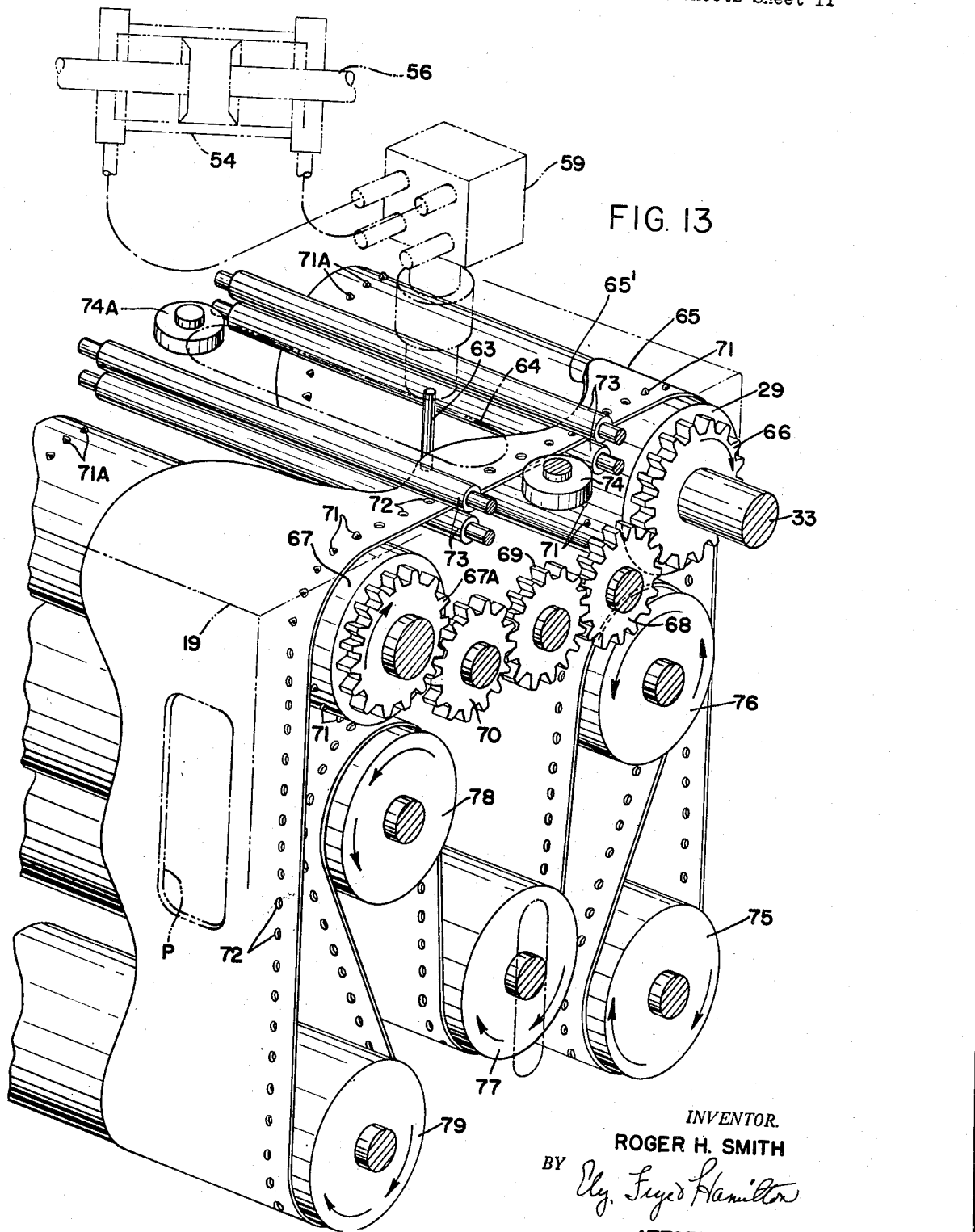
Figure 14:
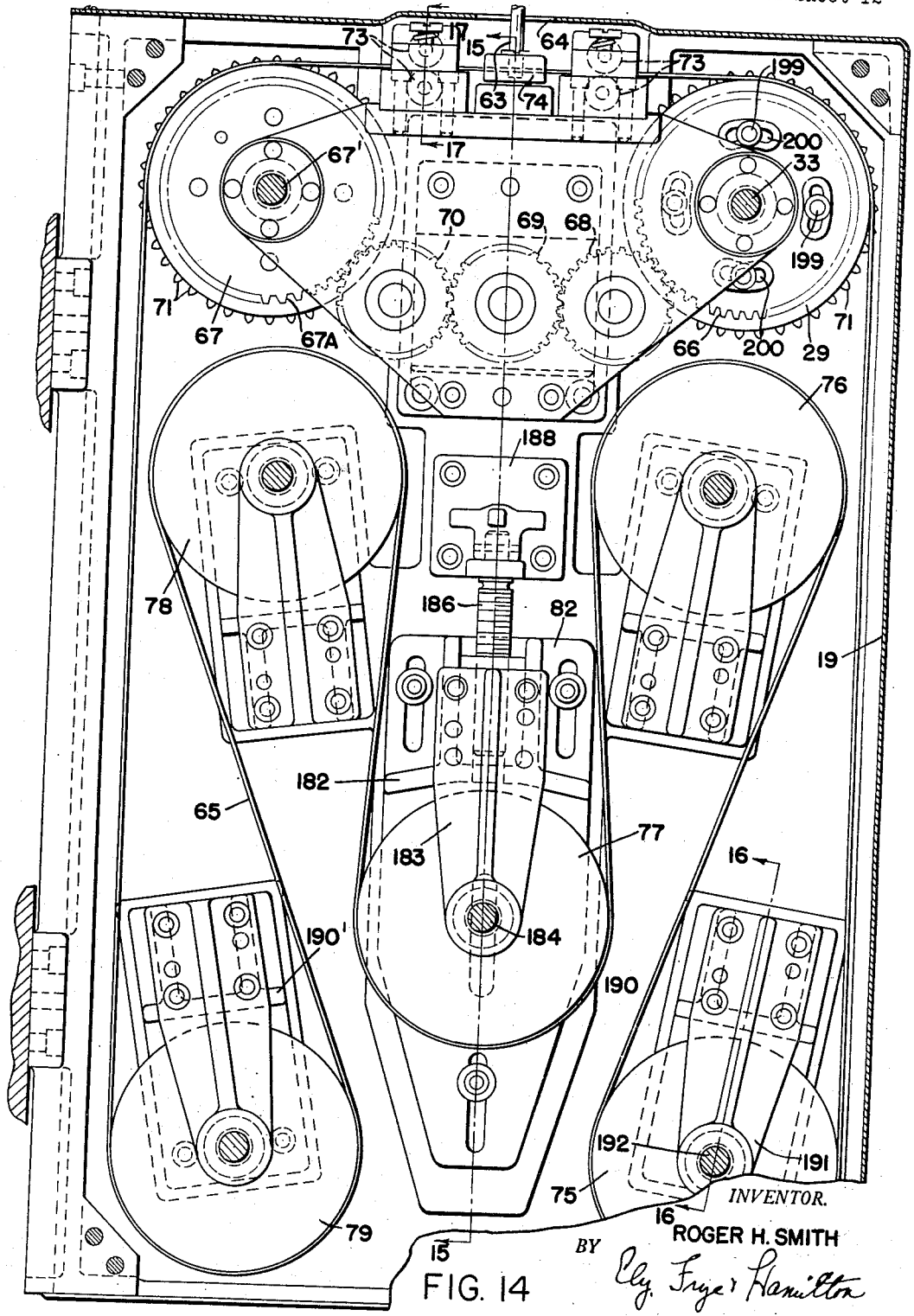

Fig. 12 is a fragmentary sectional view substantially on line 12—12, Fig. 10;

Fig. 13 is an enlarged isometric view showing the arrangement of rollers around which one of the endless belt templates passes, with the stylus in contact with the contoured edge of the template, and the template housing removed;

Fig. 14 is an end elevation of the template assembly with the housing front end plate removed;

Fig. 15 is a vertical section thereof on line 15—15, Fig. 14;

Fig. 16 is a sectional view on line 16—16, Fig. 14; and

Fig. 17 is a sectional view on line 17—17, Fig. 14.

Figure 2:
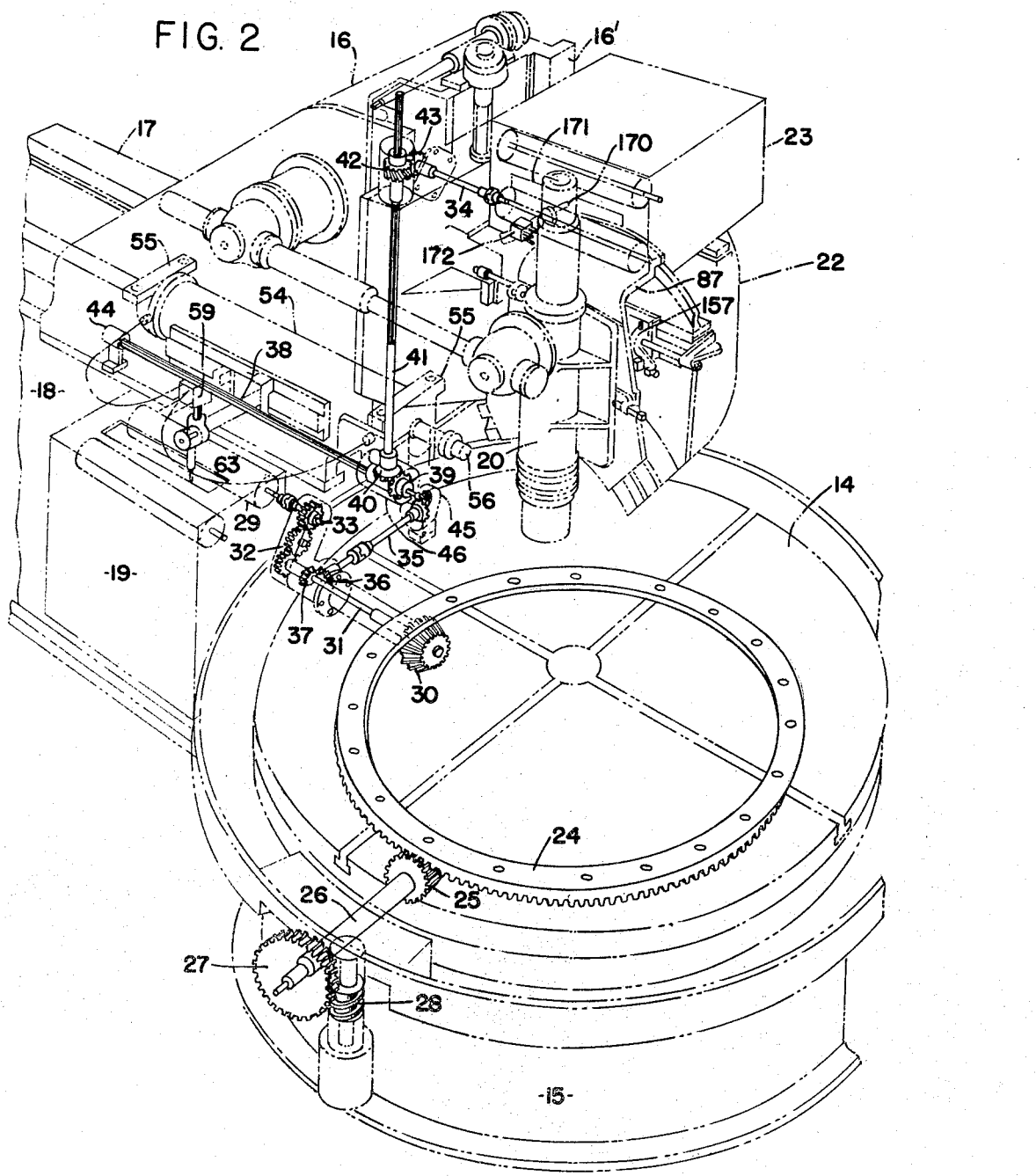
Fig. 2 is an enlarged view similar to Fig. 1 showing in full lines the driving connections to the work table and from the work to the templates which control the table and the tool spindle, and showing the remainder of the machine in chain lines.
Figure 3:
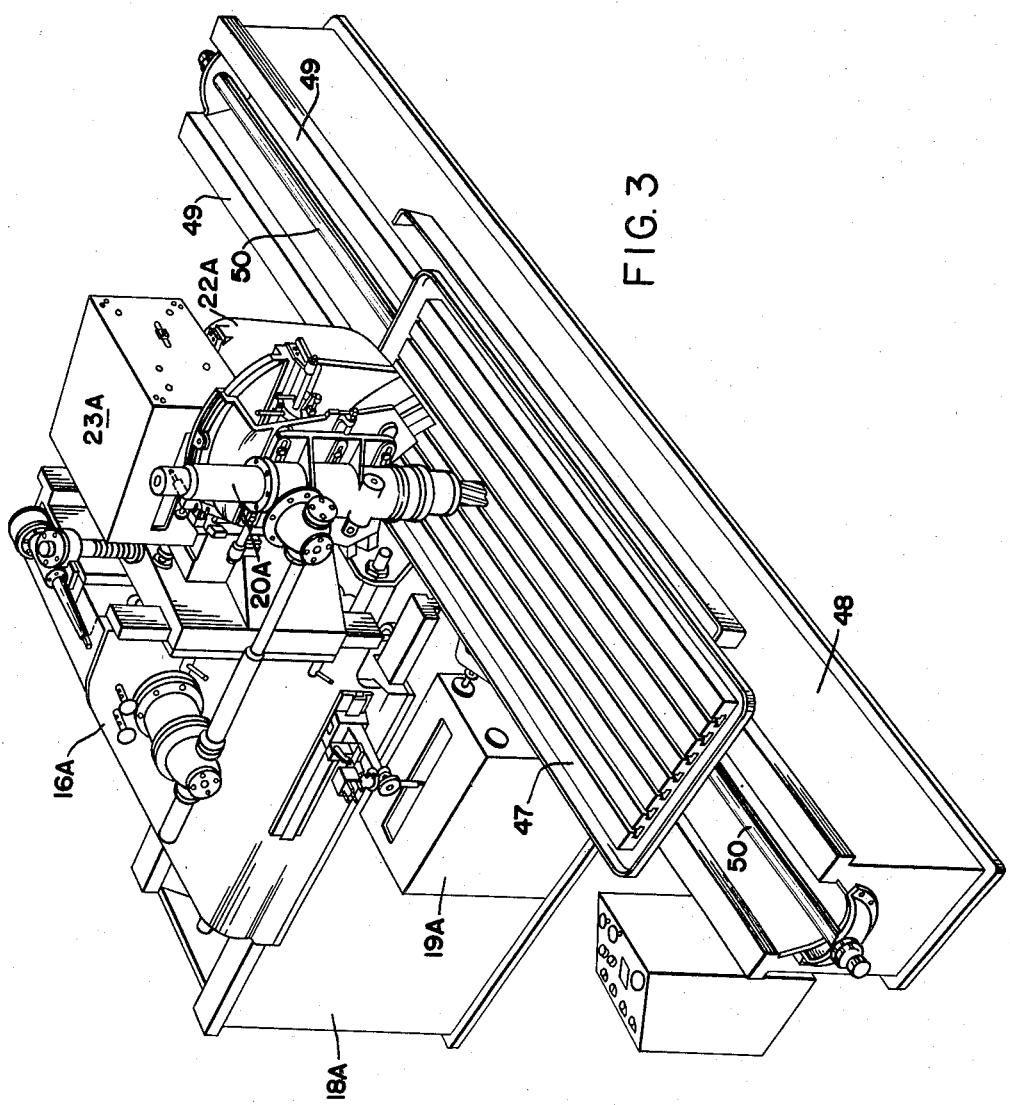
Fig. 3 is a perspective view of a contour milling machine embodying the invention and having a reciprocating table adapted principally for milling surfaces of changing angle on work of elongated or irregular shape.
Figure 4:
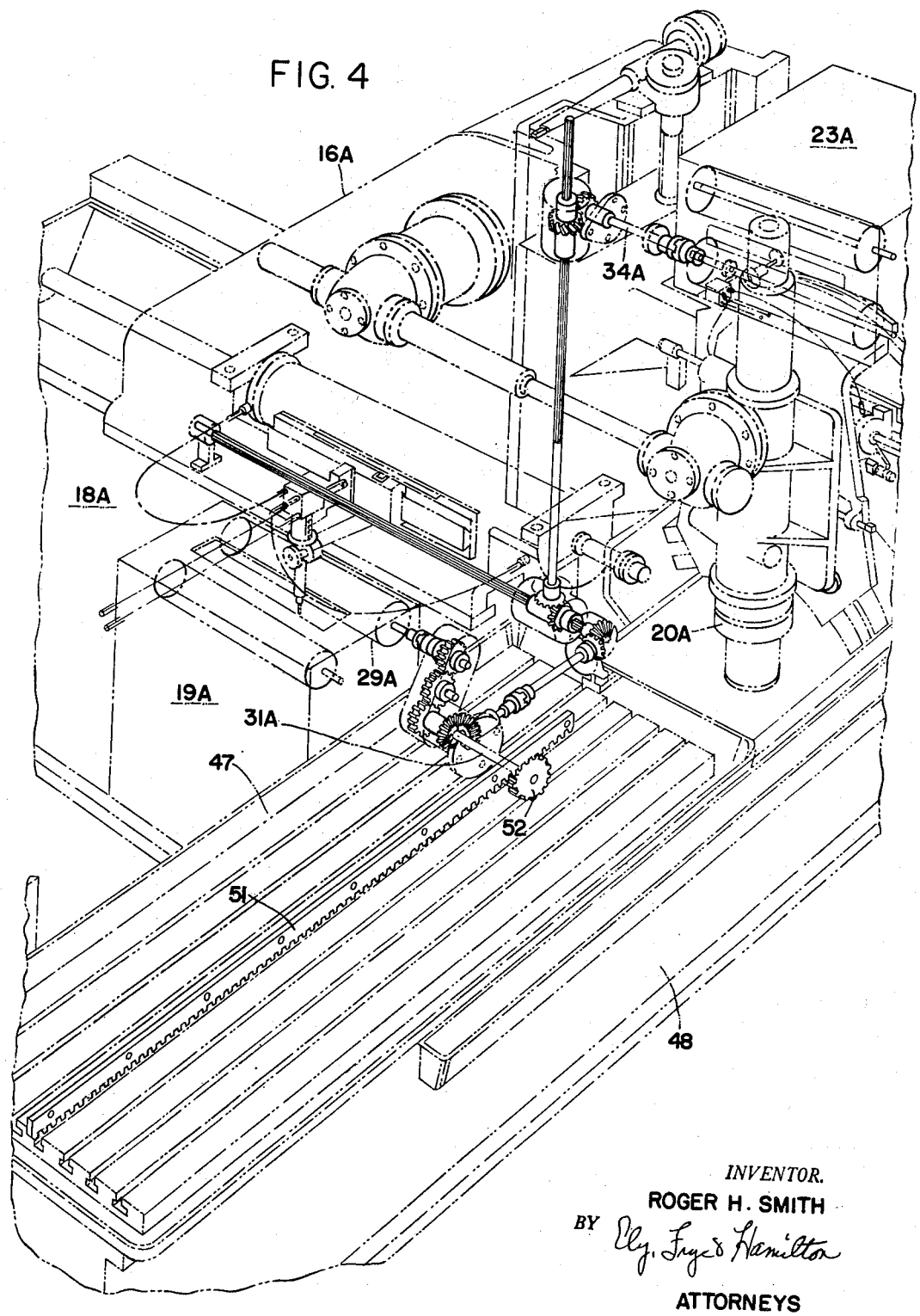
Fig. 4 is an enlarged view similar to Fig. 3 showing in full lines the driving connections to the work table and from the work table to the templates which control the table and tool spindle, and showing the remainder of the machine in full lines.

The following detailed description is directed more particularly to the machine having a rotating table shown in Figs. 1 and 2, but it will be understood that a similar arrangement of parts embodying the present invention is assembled in the machine of Figs. 3 and 4, and that modified arrangements embodying the invention may be incorporated in a variety of milling machines of the same general type.

General description

Referring first to Fig. 1, the work table indicated at 14 is rotatably mounted on a base 15, and the work head 16 of the machine is slidably mounted on ways 17 on the top of a bed 18 for movement toward and away from the workpiece on the table. This movement of the sliding head is controlled by an endless belt template mounted in a housing 19, preferably located alongside of the bed 18. The tool spindle 20 in which the tool 21 is rotatably mounted is pivoted on overhanging cutter head 22 vertically slidable on ways 16' on the work head. The pivotal mounting of the spindle allows the tool to tilt to cut surfaces of changing angles on the work, and this movement of the tool spindle is controlled by an endless belt template mounted in a housing 23 carried on the head.

Referring to Fig. 2, the work table 15 may have a ring gear 24 mounted on its under side, and the gear is driven by a bevel pinion 25 on the shaft 26 which carries a worn gear 27 on its outer end. A worm 28, driven by a suitable variable speed motor, preferably fluid drive, drives the worm gear 27. The driving connections to the drive roll 29 for the template in housing 19 include a bevel pinion 30 meshing with ring gear 24 and mounted on a shaft 31 which is geared at 32 to the shaft 33 of drive roll 29 for driving the template belt at a proper speed to make one pass of the belt equal one revolution of the table. The driving connections to the drive roll shaft 34 for the template in housing 23 are coordinated with the driving connections to the template in housing 19 and include a shaft 35 at right angles to shaft 31 and geared thereto at one end by bevel pinions 36 and 37, the other end of shaft 35 being geared by bevel pinions to an intermediate horizontal shaft 38 parallel to the ways 18. The shaft 38 is geared by bevel pinions 39 and 40 to the lower end of a vertical shaft 41 geared at its upper end of the horizontal shaft 34 by pinions 42 and 43.

As shown, the shaft 38 is splined in the pinion 39, and the ends of the shaft are journaled in suitable bearing brackets 44 and 45 which are mounted on the bed 18, so that the pinions 39 and 40 can move back and forth with the head along the shaft 38. The pinions 39 and 40 are mounted in a housing 46 secured to head 22. Pinion 42 is splined on shaft 41 so that pinions 42 and 43, along with shaft 34, can move along the shaft as the arm 22 moves along the ways 16'.

In the form of machine shown in Figs. 3 and 4 the work table 47 is reciprocable slidable on a bed 48 having ways 49, and the table is reciprocated at variable speed in a well-known manner, as by a hydraulic cylinder attached to the underside of the table and having the piston rod 50 attached at its ends to bulkheads at the ends of the bed. As shown in Fig. 4, the table has a rack 51 on its underside which is engaged by a pinion 52 on shaft 31A. Shaft 31A is geared to the drive roll 29A in template housing 19A and to the drive roll shaft 34A in template housing 23A in the same manner as the shaft 31 is geared to the corresponding template drive rolls in the machine of Figs. 1 and 2. The construction and operation of the sliding head 16A on its head 18A, the overhanging head 22A, and the tool spindle 20A are identical with the corresponding parts in the machine of Figs. 1 and 2. Both external and internal profiles may be machined by a combination movement of the work table and the work head, thereby providing for 360° trace.

The work head 16 is moved back and forth on the ways 17 by means of a hydraulic cylinder 54 (Fig. 2) which is secured within the head in a suitable manner, as by attaching to the head flanged brackets 55 at the ends of the cylinder. The piston rod 56 of the cylinder is preferably secured at its ends to suitable bulkheads 57 and 58 rigidly mounted on the bed 18 between the ways 17 (Fig. 1). The flow of fluid pressure to the ends of cylinder 54 for reciprocating the head 16 is controlled by a tracer valve 59 of conventional construction mounted on a bracket arm 60 adjustably mounted on a dovetail guideway 61 on the side of the head 16. Suitable means for clamping the bracket arm 60 in adjusted position on the guideway is indicated at 62. Flexible conduits connecting the tracer valve with the ends of cylinder 54 are indicated schematically by the curved lines in Figs. 2 and 13. By making the piston rod 56 hollow, these flexible conduits can connect the tracer valve to the ends of the hollow piston rod to supply oil to the ends of the cylinder. The tracer valve also controls, in a well-known manner, the flow of oil to the fluid drive for the table, which may be either the variable speed motor for driving the circular table or the hydraulic piston 50 for the rectangular table. Thus the motion of the table will be stopped when making a cut at right angles to the direction of movement of the table.

Depending from the outer end of bracket arm 60 and operatively connected to the tracer valve 59 is a follower or stylus 63 extending through a slot 64 in the top of housing 19. The stylus is yieldingly pressed against the contoured edge 65' of template 65 by the fluid pressure in cylinder 54 which is in turn controlled by the tracer valve 59. As the stylus is moved back and forth in the slot 64 by the template, it operates the tracer valve in a well-known manner to control the movement of the cylinder 54 and the head on which it is mounted.

The endless belt templates

Referring to Figs. 13–17, the novel endless belt template 65 is shown wrapped around a series of rollers which are mounted in the housing 19. A similar template 65A is wrapped around a similar series of rollers in housing 23, the only difference being in the pattern of the contoured edge of the template, so that only template 65 need be described. The drive roll 29 has the shaft 33, which is geared to the work table in the manner previously described. The shaft 33 has a gear 66 thereon which drives the other top roll 67 in the same direction at the same speed through a train of gears 68, 69, 70 and 67A. The rolls 29 and 67 have aligned circumferential series of uniformly spaced projections or studs 71 for progressively engaging in a linear row of uniformly spaced holes 72 along the margin of the straight edge of the belt 65. Accordingly, the run of the belt 65 between the rolls 29 and 67 is prevented from slippage and is held taut at the tracing zone without undue stretching. A similar series of studs 71A is preferably provided near the opposite end of each of the rolls 29 and 67 for engaging in a row of holes in a second belt having its straight edge adjacent thereto.

The run of the belt between the two top rolls is supported in the horizontal plane of the stylus preferably by pairs of small diameter rollers 73 at each side thereof, and between the stabilizing rollers 73 is an edge roller 74 engaging the adjacent outer straight edge of the belt to hold it in position laterally against the pressure of the stylus roller. A similar edge roller 74A is provided between the opposite ends of the rollers 73.

The edge 65' of the template 65 extends substantially lengthwise of the belt and has the desired contour for guiding the stylus 63 to operate the head 16 back and forth relative to the work table and hence move the tool 21 in a desired pattern relative to the work. In other words, the contoured edge conforms in outline to the shape of the surface to be machined on the workpiece. The developed or overall length of the template may be equal to or somewhat less than the peripheral length of the table 14, and the roll 29 is driven at such speed that the belt makes one complete pass by the stylus 63 for one revolution of the table, and is in position to start a repeat cycle. The inside profile of pockets in a workpiece may be machined by wrapping a suitable template belt having cut outs of the desired shape and size around the same rolls in position to be driven by the studs 71 or 71A. Such a template belt would be provided with cut outs between the holes 72 and the opposite edge of the belt, as shown in chain lines at P in Fig. 13.

In such case the stylus of the tracer valve would be manually inserted inside of the pocket and against one edge of the pocket. A conventional tracer valve can be manually set to follow a 360° trace by rotating the cam control on top of the valve so that it constantly exerts lateral pressure on its stylus in different directions. Thus, referring to Fig. 3, the stylus could first be positioned against one of the longer edges of pocket P and it would follow along that edge until it reached the end of the pocket. At this point the operator would manually rotate the control cam on top of the valve 90°, which automatically causes the stylus to follow along the short edge of the pocket, during which time the tracer valve would automatically stop the motion of the table and the coordinated movement of the belt template. When the stylus reaches the other side of the pocket, the control cam on the tracer valve would again be rotated 90° to change the direction of travel of the stylus and the motion of the table would be reversed, and when the stylus reaches the opposite end of the pocket the cam would be rotated another 90° to complete the 360° trace. In the event automatic feed is not desired, full manual operation can be accomplished merely by finger pressure on the stylus in the direction of feed desired.

As shown in Fig. 13, the template 65 passes from the drive roll 29 vertically downward under a bottom roll 75, upwardly over intermediate roll 76, vertically downward and under a center roll 77, thence upwardly and over an intermediate roll 78, downwardly under a bottom roll 79, and thence vertically upward and over roll 67.

The material of which the template belts are made is thin sheet material which is flexible enough to wrap around the rolls and yet has high resistance to lateral and longitudinal stretch. This material may be a plastic-impregnated pre-stretched dacron-base material made by the Dupont Company and known as "Mylar." Such material is easily cut in any pattern and adapted to have its ends accurately joined together in a smooth joint. Other materials, plastic or metallic, having the desired properties, may be used within the scope of the invention.

If the length of template 65 is equal to the peripheral length of the work, the pattern of the contoured edge of the template is laid out on a one-to-one ratio with the milled surface on the work, and if the length of the work varies from that of the template, the pattern is cut on a corresponding ratio. The contoured edge may be formed on the template belt in flat condition before its ends are joined together, but preferably is formed after joining the ends of a blank template belt. In the latter instance the blank belt is positioned around the rollers in proper position in the housing 19 and a photographic loft template of the work is placed on the table. The stylus 63 and tracer valve 59 are then mounted in the tool spindle in place of the tool and a conventional air router mounted in the bracket arm 60 in place of the stylus and tracer valve. The air router consists of a cutter driven by an air motor and the cutter engages the top surface of the blank belt template in the housing 19. Now by having the stylus follow the loft template as the table rotates, the cutter will cut the desired contour on the belt template, and by using a cutter on the air router of the same diameter as the stylus, it is not necessary to compensate for the different diameters of the tool and stylus in forming the contour pattern on the belt template.

The template 65A is preferably formed in a similar manner by placing a blank belt in position around the rollers in template housing 19 and mounting an air router in the normal position of the stylus and mounting the stylus in the tool spindle. Now a flat template of steel or aluminum is placed on the table in the same position as the loft template had been placed for the former template cutting operation. This flat template previously has been calculated and laid out by using the ratio of table travel to the required degree of tilt of the tool. Then the table and the ram are operated to make the stylus follow the template with the spindle locked in a vertical position as the router cuts the required contour on the belt.

In the machine of Figs. 3 and 4, the template in housing 19A is equally well adapted for machining work of an irregular or elongated character, and the template can be laid out and cut with an air router in the same manner as the template 65. The length of the template is made equal to the over length of the work surface to be cut, and the pattern on the template is laid out on a one-to-one ratio with the work.

In either case, the template is easily and accurately laid out on a proper ratio with the work, may be utilized for making outside and inside cuts on the work, and is adapted to be housed in compact form in a convenient location.

Referring to Figs. 14–17, the rolls 29, 67, 75, 76, 77, 78 and 79 are all preferably journaled at their rear ends in suitable bearings supported on the rear plate 80 of the housing 19. The roll 77 is mounted for vertical adjustment as shown in Fig. 15, and the other rolls are fixedly mounted in a manner of which the mounting of roll 75 shown in Fig. 16 is typical. Roll 77 is journaled at its rear end on a bearing 81 carried on a plate 82 which is vertically slidable on plate 80 by means of the bearing bolt 83 passing through slot 84 in plate 80 and the bolts 83' passing through slots 83" in plate 82.

The plate 82 has a forwardly projecting cantilever arm 182 carrying a depending plate 183 at its front end in which is mounted the shaft 184 journaling the front end of roll 77 in a bearing 81. The shaft 184 extends through a vertical slot 185 in the front plate 80A of the housing and has a clamping nut 184' on its front end. An adjusting screw 186 is screwed into a boss 187 on the arm 182, the screw being supported in a bracket arm 188 secured to the rear plate 80. Thus by loosening bolts 83 and 83' and nut 184', the roll 77 may be raised or lowered by turning the adjusting screw 186.

As shown in Fig. 16, roll 75 is journaled at its rear end on a plate 189 secured to the rear housing plate 80, and the plate 189 has a cantilever arm 190 extending forwardly and carrying a front depending plate 191 on which the front end of the roll is journaled, the front roll shaft 192 being journaled in a hole in the front plate 80A. Roll 79 is mounted in an identical manner on a cantilever arm 190', and rolls 76 and 78 are mounted in similar fashion except that the cantilever arms extend below the rolls instead of above them as in the case of rolls 75 and 79.

As shown in Fig. 14, the shafts 33 and 67', at the front ends of rolls 29 and 67 respectively, are journaled in a front plate 193 carried on the front end of a cantilever arm 194 (Fig. 15) secured at its rear end to the rear housing plate 80. The gears, 68, 69 and 70 are also mounted on plate 193, and the front edge roller 74 is preferably supported on top of said plate. The rear edge roller may be conveniently supported on top of the rear plate 80. Referring to Fig. 17, the front ends of the stabilizing rollers 73 may be journaled in bearing blocks 195 and 196 carried on the top of plate 193, the upper block 195 being yieldingly connected to the lower block by means of a spring 197 interposed between the upper block and the head of a stud 198 screwed in the lower block 196 and slidably received in the upper block 195.

Accordingly, the run of the template 65 between the rolls 29 and 67 is maintained in an accurately horizontal position by the stabilizing rollers 23, the edge roller 74 holds it against lateral shifting, and the studs 71 engaging in the holes 72 hold the belt taut without longitudinal stretching or slippage. The result is that the contour of the template is maintained in exact register with the profile of the work, and the work-piece is machined accurately according to the required pattern. Referring to Fig. 14, the roll 29 is preferably rotatably adjustable to a limited extent relative to gear 66 by means of studs 199 secured in the end of the roll and extending through slots 200 in the gear. This permits rotary adjustment of the roll to register in studs 71 with the holes 72 without moving the gear 66 out of mesh with gear 68.

Construction of the tool spindle

Referring to Figs. 5 and 5A, the tool spindle assembly indicated generally at 20 includes a tubular housing 85 having at its rear side a central mounting plate 86 (Fig. 1) secured to a quadrant plate 87 which is tiltably mounted on a vertical plate 88 of the cutter head 22. The tool spindle 89 is a hollow shaft journaled at its lower end in anti-friction bearings 90 and 91 mounted in the lower end of a mounting sleeve or quill 92 which is telescopically slidable within the lower end of housing 85. The inner races of the bearings may be secured on the spindle by a collar 93 secured on the spindle. The upper end of the quill 92 mounts a bearing 94 also journaling the spindle at that point and the inner race of the bearing 94 is supported between a shoulder on the spindle and a collar 95 screwed thereon. The lower end of sleeve 92 may have an annular cap 96 secured thereto which fits within housing 85 around the spindle head 89A for supporting bearings 90 and 91, and having the usual tapered bore 89B for receiving a cutting tool.

Above the collar 95 the spindle passes through the annular portion 97 of a cross shaft 98 on which a bevel pinion 99 is journaled for driving the bevel gear 100 splined on the spindle. The pinion 99 has an inner gear face meshing with gear 100 and an outer gear face meshing with a pinion 101' (Fig. 8) on a drive shaft 101 at right angles to cross shaft 98. The drive shaft pinion is shown in Fig. 8 within the bell-shaped housing 102, and the shaft 101 is also shown in Fig. 1 where it enters the housing 102. Housing 102 has an annular flange 103 rotatably clamped on housing 85, and has an outer cap 102' in which one end of cross shaft 98 is supported. As shown in Fig. 1, the shaft 101 extends into a sleeve cover 104 on housing 105, and the shaft is splined in bevel gear (not shown) in housing 105 which is similarly rotatable on the work head, and said bevel gear is connected to the shaft of a suitable motor for driving the tool spindle. The splined shaft 101 and the rotatable bell housings 102 and 105 allow for vertical adjustment of the cutter head 22 on the ways 16' of the work head and tilting of spindle 85 for angular cuts.

The bevel gear 100 is journaled in spaced anti-friction bearings 107 and 108 supported in a sleeve 109 within the spindle housing and having their inner races secured by a collar 110 screwed on the gear 100. The sleeve 109 has an outer annular flange 111 to which is attached the lower annular flange 112 of an inner guide tube 113 and the lower end of the upper spindle housing 85'. Referring to Fig. 5A, the guide tube 113 extends upwardly around the spindle and slidably supports a piston 114 the outer surface of which is slidable in housing 85. A tube 115 extending upwardly from the piston 114 is slidable over the guide tube 113 and tube 115 supports an anti-friction bearing 116 at its upper end in which the upper end of spindle 89 is journaled. The top of housing 85 has an annular closure member 117 secured therein which fits slidably around tube 115. The member 117 has an annular seal 118 around the tube 115, and the piston 114 carries inner and outer seals 119 and 120 fitting the tube 113 and housing 85', respectively.

By introducing fluid pressure through the connection 121 above the piston 114, the tube 115 and the spindle 89 may be forced downwardly within the spindle housing against the resistance of the work, and a cap plate 122 on the upper end of the tube limits its downward movement.

A shoulder 123 on the lower end of the tube 115 limits its upward movement. During such vertical movement the bevel gear 100 remains in driving engagement with the spindle 89 through the interengaging splines 124 and 124'. By exhausting fluid through the connection 121, the operator of the machine may manually raise his cutting tool above the work surface at any time, and adjustable means are provided for holding the tool at the same relative location when it is again lowered.

The adjustable stop means for holding the spindle in a desired location provides for positioning the ends of various length tools at the same location relative to the work, so as to locate the end of the tool at the center of the tilting radius. As shown in Figs. 6 and 7, the lower end 85' of housing 85 has a longitudinal boss 126 thereon in which a longitudinal groove 127 is enclosed. A stop nut 128 is vertically slidable in said groove 127 and an adjusting screw 129 is threaded through the nut and has a squared portion 130 and a micrometer wheel 131 at its lower end. A bushing 132 is secured in the bottom end of groove 127 by a cap screw 133, and a collar 134 on the screw 129 is rotatably supported on said bushing.

A stop lug 135 on the quill 92 extends slidably into groove 127 around the screw 129 above the nut 128 for abutting the nut. The lug 135 is seated in a groove 136 in the outer surface of the quill, and its rear flange 137 is secured in the groove by cap screws 138. The upper end of the screw 129 is normally held against turning by a set screw 139.

Accordingly when the piston 114 is forced downwardly by fluid pressure, the spindle 89 and quill 92 are forced downwardly until the stop lug 135 abuts the nut 128, and the tool is held in that position by the fluid pressure against the upward thrust of the work. By loosening set screw 139 and turning screw 129 in the nut 128 the position of the nut may be adjusted accurately to position the elevation of the point of the tool as desired.

Tiltable mounting of the tool spindle on the cutter head

The mounting plate 86 of the tool spindle assembly 20 is preferably horizontally adjustable on quadrant plate 87 by means of three vertically spaced pairs of bolts 145 on the plate 87 extending through horizontal slots (Fig. 1) in the mounting plate 86. As best shown in Figs. 8 and 9, accurate adjustment of the plate 86 horizontally is provided for by two adjusting screws 146, one at each side of plate 86, threaded through lugs 147 on the quadrant plate 87 and abutting the side edges of plate 86. A horizontal key 148 may be provided on plate 87 between the middle bolts 145 for engaging in a mating groove on plate 86 to slidably support the same.

As shown in Figs. 8 and 10, the quadrant plate 87 preferably narrows toward its upper end which curves into a rearwardly extending portion terminating in an upwardly offset flange 149 which is curved laterally about a center substantially in the same horizontal plane in which the cutting end of the tool is located. A retaining plate 150 is secured to the offset flange 149 and forms with the offset flange an arcuate groove slidable on the arcuate rib 151 at the top of the plate 88 on the cutter head. Conventional grease fittings 152 may be provided in flange 149 to lubricate the rib 151.

The lower portion of quadrant plate 87 has a rearwardly projecting arcuate rib 152 which is concentric with the arc of rib 151, and which is slidably received in an arcuate groove 153 in the front face of arcuate rib 154 projecting forwardly from the cutter head plate 88. The lower arcuate edge of plate 87 has a rearwardly directed arcuate flange 155 extending under the rib 154, and a retaining plate 156 is attached to flange 155 and extends behind rib 154.

A hydraulic cylinder 157, for rocking the plate 87 on the plate 88 to tilt the spindle, is located between the plates 87 and 88, and has a base 158 mounted for horizontal sliding movement on a dovetail rib 159 on plate 88 above arcuate rib 154. The piston rod 160 of said cylinder extends through and projects from both ends thereof, one end of the rod being secured to the cutter head housing by a bracket 161 and the other end being secured to the cutter head housing by a bracket 162. The means for rocking the quadrant plate 87 as the cylinder 157 reciprocates on the rod 160 preferably comprises a pair of flexible bands 163, connected at opposite ends to an arcuate supporting bar 164 on the rear of plate 87, and connected at their opposite ends to opposite ends of the cylinder 157.

As shown in Fig. 10, the bands 163 are supported in side-by-side relation on the bar 164, one end of one band being anchored to the bar 164 by a clamp 165 and the opposite end of the other band being similarly anchored to the bar 164 by another clamp 165. The bands leave the bar horizontally at a tangent thereto and their free ends are adjustably attached by clamps 166 to brackets 167 extending angularly from opposite ends of the cylinder 157.

The template controlling tilting of the tool spindle

The template for tilting the tool according to the changing angle of the working surface is an endless belt 65A contained in housing 23 and driven in the manner previously described from the work table. The construction and mounting of the belt template 65A in housing 23 is identical with the belt template 65 in housing 19. The contoured edge is engaged by a stylus 170 extending through a slot 171 in housing 23 and actuating the tracer valve 172 which is connected to the ends of the cylinder 157 by flexible conduits indicated by chain lines in Fig. 2 for controlling the tilting movement of the quadrant plate 87 and the tool spindle 20 mounted thereon. Thus, as table 14 rotates, the template engaging stylus 170 is driven at a coordinated speed such that the template makes one pass for one revolution of the table, and tilts the tool to conform to the changing angle of the work surface being machined. The pattern of the contoured edge is laid out by measuring transversely of the belt from the indexing holes 72, and after the layout points are established, they are connected by a scribed line and the contoured edge then cut along said line.

Operation

After the belt templates 65 and 65A are cut, which is preferably done as previously described, the template 65 being cut in place by mounting an air router in place of stylus 63 and mounting the stylus in the tool spindle 20 with tracer valve 59 operatively attached, and then driving the table to cause the air router to cut the desired contour pattern in the template. After the templates have been cut the mating part of each belt is removed, the two styluses with their tracer valves mounted in proper position contacting the contoured edges of the respective belts, and the desired cutting tool mounted in the tool spindle.

The workpiece is now clamped on the table in place of the loft template, the tool 21 adjusted to proper position relative to the work, and the tool and table set in motion. The machining operation will be carried on automatically around the complete periphery of the workpiece, or from one extremity to the other, or around the peripheries of inside cutouts, as may be required, the reciprocating movement of the head 16 controlled by template 65 causing the tool to follow the outline of the work, regardless of irregularities, and the tilting movement of the spindle controlled by the other template 65A causing the tool to follow the gradually changing angle of the work surface.

Accordingly, a novel template system is provided which simplifies the laying out and improves the accuracy of the pattern, and which is adapted for use with a variety of machines. The improved system is adapted for making either inside or outside cuts, and both type of cuts can be made on the same workpiece by mounting different belt templates on the same set of rollers. The novel template construction is inexpensive to manufacture, and a large number of templates can easily be supplied with one machine for a large number of operations. Moreover, the novel templates are adapted to be housed in a compact housing which may be conveniently mounted in any convenient location on the machine.

What is claimed is:

1. A template comprising an endless belt having a contoured edge determining a predetermined operational control cycle, a drive roll for the belt, an adjacent roll for holding said belt in taut condition at the tracing zone, said contoured edge extending the full length of the belt, whereby a repeat cycle can be started as a continuation of a preceding cycle upon finishing a complete pass of the belt.

2. A template for machining a workpiece comprising a flexible belt having a contoured edge extending lengthwise of the belt, said contoured edge conforming in outline to the shape of the surface to be machined on the workpiece.

References Cited in the file of this patent

UNITED STATES PATENTS

| 2,367,568 | Drown | Jan. 16, 1945 |
| 2,628,539 | Neergaard | Feb. 17, 1953 |
| 2,674,160 | Martellotti | Apr. 6, 1954 |

FOREIGN PATENTS

| 709,099 | Great Britain | May 12, 1954 |